(12) United States Patent
Kaneko (10) Patent No.: US 9,985,305 B2
(45) Date of Patent: May 29, 2018

(54) OUTPUT CONTROL APPARATUS FOR FUEL CELL

(75) Inventor: Tomohiko Kaneko, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 638 days.

(21) Appl. No.: 14/355,374

(22) PCT Filed: Nov. 1, 2011

(86) PCT No.: PCT/JP2011/075208
§ 371 (c)(1),
(2), (4) Date: Apr. 30, 2014

(87) PCT Pub. No.: WO2013/065132
PCT Pub. Date: May 10, 2013

(65) Prior Publication Data
US 2014/0248548 A1     Sep. 4, 2014

(51) Int. Cl.
*H01M 8/04* (2016.01)
*H01M 8/04858* (2016.01)
*H01M 8/04828* (2016.01)
H01M 8/04537 (2016.01)
H01M 8/1018 (2016.01)

(52) U.S. Cl.
CPC ..... *H01M 8/04865* (2013.01); *H01M 8/0488* (2013.01); *H01M 8/0494* (2013.01); *H01M 8/04925* (2013.01); *H01M 8/04559* (2013.01); *H01M 8/04589* (2013.01); *H01M 2008/1095* (2013.01)

(58) Field of Classification Search
CPC ............ H01M 8/0488; H01M 8/0494; H01M 8/04925; H01M 8/04865; H01M 8/04559; H01M 2008/1095; H01M 8/04589
See application file for complete search history.

(56) References Cited

U.S. PATENT DOCUMENTS

| | | | |
|---|---|---|---|
| 2009/0029197 A1 | 1/2009 | Hibino et al. | |
| 2009/0067202 A1* | 3/2009 | Ichikawa | ............ B60L 11/1868 363/79 |

(Continued)

FOREIGN PATENT DOCUMENTS

| | | |
|---|---|---|
| CN | 101904036 A | 12/2010 |
| DE | 112006001469 T5 | 4/2008 |

(Continued)

*Primary Examiner* — Jonathan Crepeau
*Assistant Examiner* — Angela Martin
(74) *Attorney, Agent, or Firm* — Hunton Andrews Kurth LLP (57) ABSTRACT

The object of the present invention is to balance: the suppression of deterioration of a fuel cell and degradation of its durability and the optimization of the output control of the fuel cell. The present invention provides an output control apparatus for a fuel cell, being capable of switching a control mode between a power control mode in which an output power of a fuel cell connected to a load is controlled so as to be at a target power and a voltage control mode in which an output voltage of the fuel cell is controlled so as to be at a target voltage, wherein a control in the voltage control mode is performed when the output voltage of the fuel cell decreases below a predetermined low voltage threshold value.

6 Claims, 4 Drawing Sheets (56) References Cited

U.S. PATENT DOCUMENTS

| | | | | |
|---|---|---|---|---|
| 2010/0127710 A1* | 5/2010 | Hasegawa | ......... | H01M 8/04544 324/433 |
| 2010/0248054 A1 | 9/2010 | Umayahara et al. | | |
| 2010/0273075 A1* | 10/2010 | Imanishi | ........... | H01M 8/04268 429/432 |
| 2010/0291447 A1* | 11/2010 | Imanishi | ........... | H01M 8/04268 429/429 |
| 2011/0033762 A1 | 2/2011 | Yoshida | | |
| 2011/0187308 A1* | 8/2011 | Suhama | .................. | H02P 27/04 318/798 |
| 2011/0217608 A1* | 9/2011 | Matsumoto | ....... | H01M 8/04619 429/428 |

FOREIGN PATENT DOCUMENTS

| | | | | | |
|---|---|---|---|---|---|
| DE | 112008003145 | T5 | 10/2010 | | |
| DE | 112008003416 | T5 | 10/2010 | | |
| JP | S60-219920 | A | 11/1985 | | |
| JP | 2005-123110 | | * 5/2005 | ............. | H01M 8/04 |
| JP | 2005-123110 | A | 5/2005 | | |
| JP | 2007-265840 | | * 10/2007 | ............. | H01M 8/04 |
| JP | 2007-265840 | A | 10/2007 | | |
| JP | 2009-151997 | | * 7/2009 | ............. | H01M 8/04 |
| JP | 2009-151997 | A | 7/2009 | | |
| JP | 2010-045889 | A | 2/2010 | | |
| JP | 2010-124615 | A | 6/2010 | | |

\* cited by examiner

OUTPUT CONTROL APPARATUS FOR FUEL CELL

CROSS-REFERENCE TO RELATED APPLICATIONS

This is a national phase application based on the PCT International Patent Application No. PCT/JP2011/075208 filed on Nov. 1, 2011, the entire contents of which are incorporated herein by reference.

TECHNICAL FIELD

The present invention relates to an output control apparatus for a fuel cell.

BACKGROUND ART

As an example of power systems used for fuel cell vehicles, the technique disclosed in Patent Document 1 has been known. In this power system, an actual measured value of the output power of a fuel cell is output from an FC-measured power input means to a deviation computation means and a command current computation means derives a requested current command value for the fuel cell by dividing a requested FC power command value by the output voltage of the fuel cell.

On the other hand, the power system disclosed in Patent Document 2 includes: a fuel cell and a battery which are connected in parallel with respect to a load; a first converter arranged between the fuel cell and the load; and a second converter arranged between the battery and the load, in which the first or second converter controls the output current of the fuel cell or the battery.

RELATED ART DOCUMENTS

Patent Documents

Patent Document 1: JP2010-124615 A
Patent Document 2: JP2010-045889 A

DISCLOSURE OF THE INVENTION

Problem to be Solved by the Invention

In fuel cell systems, the output power of a fuel cell is directly controlled, from the perspectives of: efficient energy management of the entire fuel cell system, including the fuel cell, a battery and auxiliary machines; improvements in responsibility to rapid variations of the requested amount of power generation (which occurs, for example, when rapid acceleration is requested in a fuel cell vehicle); and protection of the battery. However, when the power generation state of a fuel cell is controlled by a feedback control based on a deviation between a requested power and an output power (i.e., a control in a power control mode) from the above-mentioned perspectives, the output voltage of the fuel cell may sometimes decrease to an unfavorable output voltage value, which may cause deterioration of the fuel cell and degradation of its durability.

For example, a solid polymer fuel cell has a membrane-electrode assembly in which a polymer electrolyte membrane for selectively transporting hydrogen ions is sandwiched by a pair of electrodes made of a porous material, with each of the pair of electrodes having a catalyst layer containing, as a main component thereof, carbon powder supporting a platinum-based metallic catalyst (hereinafter referred to as the "electrode catalyst") and a gas diffusion layer which has both air permeability and electronic conductivity.

If the output voltage of the fuel cell of this type decreases below a predetermined voltage threshold value during its operation, deterioration of the electrode catalyst and degradation of its durability will occur. Thus, from the perspective of preventing such deterioration of the electrode catalyst and degradation of its durability, it is also required that the power generation state of the fuel cell be controlled so as to keep the output voltage at the predetermined voltage threshold value or higher.

However, while the control in the power control mode is being performed, even if the output voltage of the fuel cell decreases below the predetermined voltage threshold value, the feedback control only works so as to reduce the deviation between the requested power and the output power and it is thus impossible to avoid the problems of deterioration of the electrode catalyst and degradation of its durability. If the power generation state of the fuel cell is subjected to the feedback control based on the deviation between a requested voltage and an output voltage in order to prevent such deterioration of the electrode catalyst and degradation of its durability, then it becomes difficult to achieve efficient energy management and improvements in responsibility, which could lead to deterioration of a battery and degradation of its durability.

The present invention has been made in order to solve the above problems and the object of the invention is to balance: suppression of the deterioration of a fuel cell and the degradation of its durability; and optimization of the output control of the fuel cell.

Means for Solving the Problem

In order to solve the above problems, the present invention provides an output control apparatus for a fuel cell, being capable of switching a control mode between a power control mode in which an output power of a fuel cell connected to a load is controlled so as to be at a target power and a voltage control mode in which an output voltage of the fuel cell is controlled so as to be at a target voltage, the output control apparatus employing a configuration in which a control in the voltage control mode is performed when the output voltage of the fuel cell decreases below a predetermined low voltage threshold value.

With such configuration, since the control is performed such that the output power of the fuel cell is at a target power during, for example, the normal operation of the fuel cell, efficient energy management and improvements in responsibility can be achieved. In addition, by applying such configuration to a fuel cell system including a battery which is arranged in parallel with the fuel cell with respect to the load, an excess charge and an excess discharge of the battery can be suppressed and protection of the battery can also be achieved.

When the output voltage of the fuel cell decreases below the predetermined low voltage threshold value while the control in the power control mode is being performed, the control based on the power is switched to the control based on the voltage where the output voltage of the fuel cell is controlled so as to be at a target voltage. Thus, it is possible to avoid the deterioration of an electrode catalyst in the fuel cell and the degradation of its durability which result from the decrease of the output voltage.

It should be noted that the "predetermined low voltage threshold value" refers to a voltage value which does not cause deterioration of the electrode catalyst in the fuel cell and degradation of its durability and such value is set as appropriate in accordance with the specification of the electrode catalyst, etc.

In the above configuration, the target voltage of the fuel cell may be set to the low voltage threshold value or a value obtained by adding a predetermined extra value to the low voltage threshold value and then the control in the voltage control mode may be performed.

With such configuration, a control is performed such that the output voltage of the fuel cell is increased to the low voltage threshold value or higher. In particular, in a situation in which the target voltage of the fuel cell has been set to the value obtained by adding the predetermined extra value to the low voltage threshold value, it becomes possible to rapidly resolve the state in which the output voltage of the fuel cell is below the low voltage threshold value.

As described above, the output voltage of the fuel cell should not be excessively low. However, on the other hand, an excessively high output voltage will cause degradation of the fuel cell (more specifically, for example, deterioration of a polymer electrolyte membrane in the fuel cell) and degradation of its durability.

In consideration of such aspect, in order to avoid a problem which may arise during such a high-voltage condition, the output control apparatus having the above configuration may alternatively be configured such that the control in the voltage control mode is performed when the output voltage of the fuel cell increases above a predetermined high voltage threshold value.

In this configuration, the target voltage of the fuel cell may be set to the high voltage threshold value or a value obtained by subtracting a predetermined extra value from the high voltage threshold value and then the control in the voltage control mode may be performed.

With such configuration, a control is performed such that the output power of the fuel cell is decreased to the high voltage threshold value or lower. In particular, when the target voltage of the fuel cell is set to the value obtained by subtracting the predetermined extra value from the high voltage threshold value, it becomes possible to rapidly resolve the state in which the output voltage of the fuel cell is above the high voltage threshold value.

In the above configuration, the output control apparatus may comprise a duty computing part which computes a duty command value to be supplied to a boost converter which boosts the output voltage of the fuel cell and outputs the boosted voltage to the load, in which the duty computing part outputs a first duty command value calculated using the output power and the target power of the fuel cell while the control is being performed in the power control mode and outputs a second duty command value calculated using the output voltage and the target voltage of the fuel cell while the control is being performed in the voltage control mode.

In this configuration, the duty computing part may comprise a control mode switching part which selects, as the duty command value to be output, the first duty command value when the control in the power control mode is performed and selects the second duty command value when the control in the voltage control mode is performed The above configuration assumes that the control mode is switched under the condition that the output voltage of the fuel cell decreases below the predetermined low voltage threshold value or increases above the high voltage threshold value. However, considering the fact that a certain correlation is established between the output voltage of the fuel and the output current and output power of the fuel cell, it may alternatively be possible to switch the control mode based on a predetermined high current threshold value or a predetermined low power threshold value corresponding to the "predetermined low voltage threshold value" or based on a predetermined low current threshold value or a predetermined high power threshold value corresponding to the "predetermined high voltage threshold value."

Specifically, the control mode may be switched under the condition that (1) the output current of the fuel cell increases above a predetermined high current threshold value, or (2) the output power of the fuel cell decreases below a predetermined low power threshold value, instead of the above-mentioned condition that "the output voltage of the fuel cell decreases below a predetermined low voltage threshold value." Alternatively, the control mode may be switched under the condition that (3) the output current of the fuel cell decreases below a predetermined low current threshold value, or (4) the output power of the fuel cell increases above a predetermined high power threshold value, instead of the above-mentioned condition that "the output voltage of the fuel cell increases above a predetermined high voltage threshold value".

Effect of the Invention

According to the present invention, it is possible to balance: the suppression of deterioration of a fuel cell and degradation of its durability; and the optimization of the output control of the fuel cell.

MODE FOR CARRYING OUT THE INVENTION

An embodiment of a fuel cell system including an output control apparatus for a fuel cell according to the present invention will be described below with reference to the attached drawings. This embodiment assumes that the fuel cell system is used as an in-vehicle power generation system for a fuel cell hybrid vehicle (FCHV).

Figure 1:
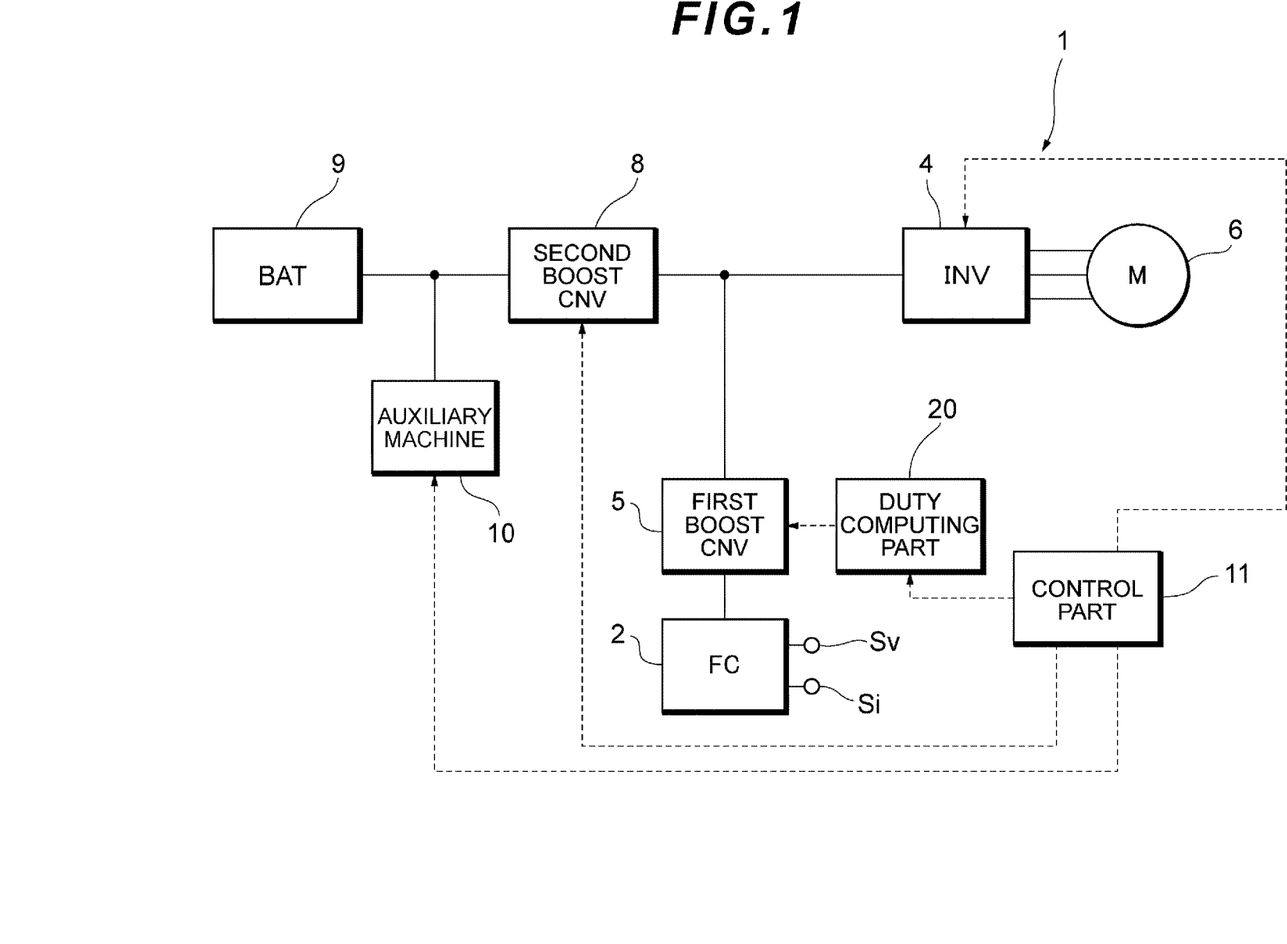
FIG. 1 is a configuration diagram schematically showing an embodiment of an output control apparatus for a fuel cell according to the present invention.

First, the configurations of the fuel cell system will be described with reference to FIG. 1. As shown in FIG. 1, the fuel cell system 1 includes a fuel cell 2 which generates electric power through an electrochemical reaction between an oxidant gas and a fuel gas serving as reactant gases. The power generation state of the fuel cell 2 is controlled by a control part 11.

The fuel cell 2 may be, for example, a polymer electrolyte fuel cell and has a stack structure with a plurality of unit cells stacked in series. The unit cells each include: a membrane-electrode assembly (hereinafter referred to as an "MEA") in which a polymer electrolyte membrane for selectively transporting hydrogen ions is sandwiched by a pair of electrodes made of a porous material; and a pair of separators sandwiching such MEA.

Each electrode in the pair of electrodes has a catalyst layer containing, as a main component thereof, carbon powder supporting a platinum-based metallic catalyst (hereinafter referred to as an "electrode catalyst") and a gas diffusion layer which has both air permeability and electronic conductivity. The fuel cell 2 is provided with a voltage sensor Sv for detecting its output terminal voltage and a current sensor Si for detecting its output current.

In addition, the fuel cell 2 is connected to a first boost converter 5. The first boost converter 5 is a direct-current voltage converter which has a function of regulating a direct-current voltage input from the fuel cell 2 and outputting the resulting voltage to an inverter 4. The first boost converter 5 is connected to a drive motor (load) 6 via the inverter 4 and is also connected to a battery 9, being a secondary cell, and various types of auxiliary machines 10 via a second boost converter 8.

The second boost converter 8 is a direct-current voltage converter which has a function of regulating a direct-current voltage input from the battery 9 and outputting the resulting voltage to the inverter 4 and a function of regulating a direct-current voltage input from the fuel cell 2 or the drive motor 6 and outputting the resulting voltage to the battery 9. Such functions of the second boost converter 8 allow the battery 9 to be charged and discharged.

The battery 9 has stacked battery cells and provides a certain level of high voltage as its terminal voltage. The battery 9 is capable of: being charged with an excess power obtained by subtracting power consumed by the entire load including the drive motor 6 from the output power of the fuel cell 2; and serving as a secondary power supply for the drive motor 6. When the battery 9 is continued to be used with its SOC (State of Charge), i.e., the remaining capacity thereof, being in an extremely high region or an extremely low region, the deterioration or degradation of durability of the battery 9 may proceed.

Thus, in principle, the fuel cell system 1 in this embodiment controls the power generation state of the fuel cell 2 based on the output power of the fuel cell 2 and controls the power generation state of the fuel cell 2 based on the output voltage of the fuel cell 2 under predetermined conditions (to be described later).

The drive motor 6 may be, for example, a three-phase alternate-current motor, which serves as a main power source of a fuel cell vehicle in which the fuel cell system 1 is installed. The inverter 4 connected to the drive motor 6 converts a direct current to a three-phase alternate current and supplies the resulting three-phase alternate current to the drive motor 6.

The control part 11 is a higher-level control apparatus which controls the operations of various devices in the system, based on, for example, the amount of operation of an acceleration operating member (e.g., an accelerator) provided in the fuel cell vehicle. A duty computing part 20 for computing a duty command value to be supplied to the first boost converter 5 is provided between the control part 11 and the boost converter 5. In short, in this embodiment, the output control apparatus for the fuel cell according to the present embodiment is constituted by the first boost converter 5, the control part 11 and the duty computing part 20.

Figure 2:
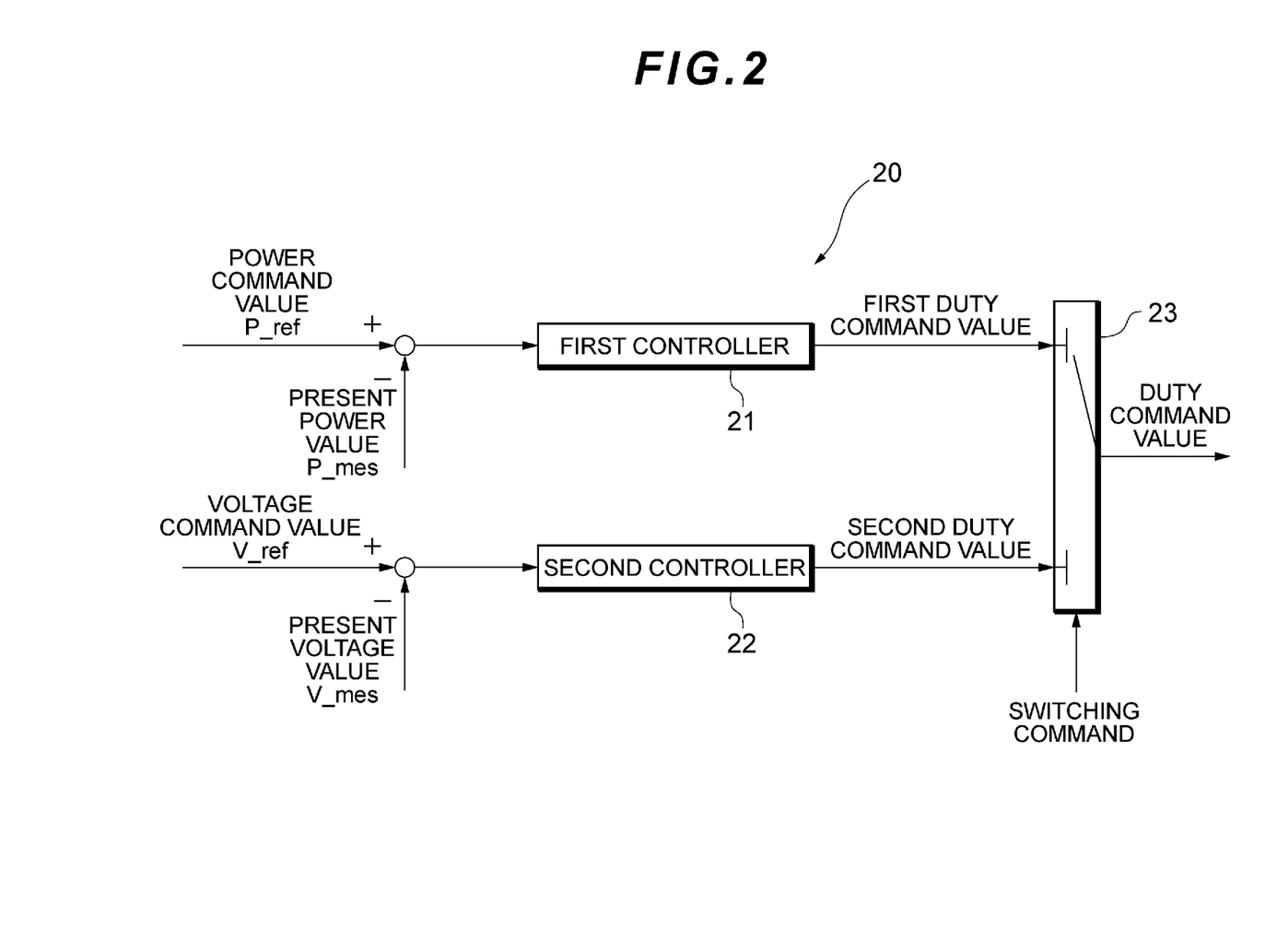
FIG. 2 is a block diagram showing an embodiment of a duty computing part in FIG. 1.

Next, an embodiment of the duty computing part 20 shown in FIG. 1 will be described in detail with reference to FIG. 2. In the duty computing part 20 according to this embodiment, a first controller 21 related to the control of the fuel cell 2 in a power control mode and a second controller 22 related to the control of the fuel cell 2 in a voltage control mode are connected to each other in parallel.

The first controller 21 is included in a feedback control circuit and receives, as inputs, a power command value P_ref output from, for example, the control part 11 serving as a higher-level control apparatus, as a plus component and a present power value P_mes calculated from the respective output values of the current sensor Si and voltage sensor Sv as a minus component. In other words, a differential power value $\Delta P$, being a differential value between the power command value P_ref and the present power value P_mes, i.e., a shortfall in the amount of generated power relative to the amount of power requested from the fuel cell 2, is input to the first controller 21. The first controller 21 outputs a first duty command value for the first boost converter 5 based on the differential power value $\Delta P$.

The second controller 22 is included in the feedback control circuit and receives, as inputs, a voltage command value V_ref output from, for example, the control part 11 as a plus component and a present voltage value V_mes calculated from the output value of the voltage sensor Sv as a minus component. In other words, a differential voltage value $\Delta V$, being a differential value between the voltage command value V_ref and the present voltage value V_mes is input to the second controller 22. The second controller 22 outputs a second duty command value for the first boost converter 5 based on the differential voltage value $\Delta V$.

A switch (control mode switching part) 23 is provided in the downstream of the first controller 21 and the second controller 22. The switch 23 selects a duty command value to be finally supplied to the first boost converter 5. The switching operation of the switch 23 is controlled based on a switching command from, for example, the control part 11, such that the first duty command value output from the first controller 21 is selected when it is preferable to control the power generation state of the fuel cell 2 in the power control mode (e.g., during normal operation and when rapid acceleration is requested), while the second duty command value output from the second controller 22 is selected when it is preferable to control the power generation state of the fuel cell 2 in the voltage control mode (e.g., in a situation in which the output voltage of the fuel cell 2 decreases below a predetermined low voltage threshold value or increases above a predetermined high voltage threshold value).

This embodiment not only allows both the power command value P_ref and the voltage command value V_ref to be input but also allows the output of the fuel cell 2 to be controlled based on one of these two command values. Accordingly, it is possible to select and perform the control mode for controlling the output power of the fuel cell 2 so that it is at a target value mainly for the purpose of energy management and protection of the battery during, for example, the normal operation or when the rapid acceleration is requested, while it is also possible to select and perform the control mode for directly controlling the output voltage of the fuel cell 2 so that it is at a target value for the purpose of suppressing the deterioration of the fuel cell 2 and/or the degradation of its durability when the output voltage of the fuel cell 2 needs to be controlled so that it is at a predetermined low voltage threshold value or higher or at a predetermined high voltage threshold value or lower due to the necessity of suppressing the deterioration of the fuel cell 2 and the degradation of its durability.

Figure 3:
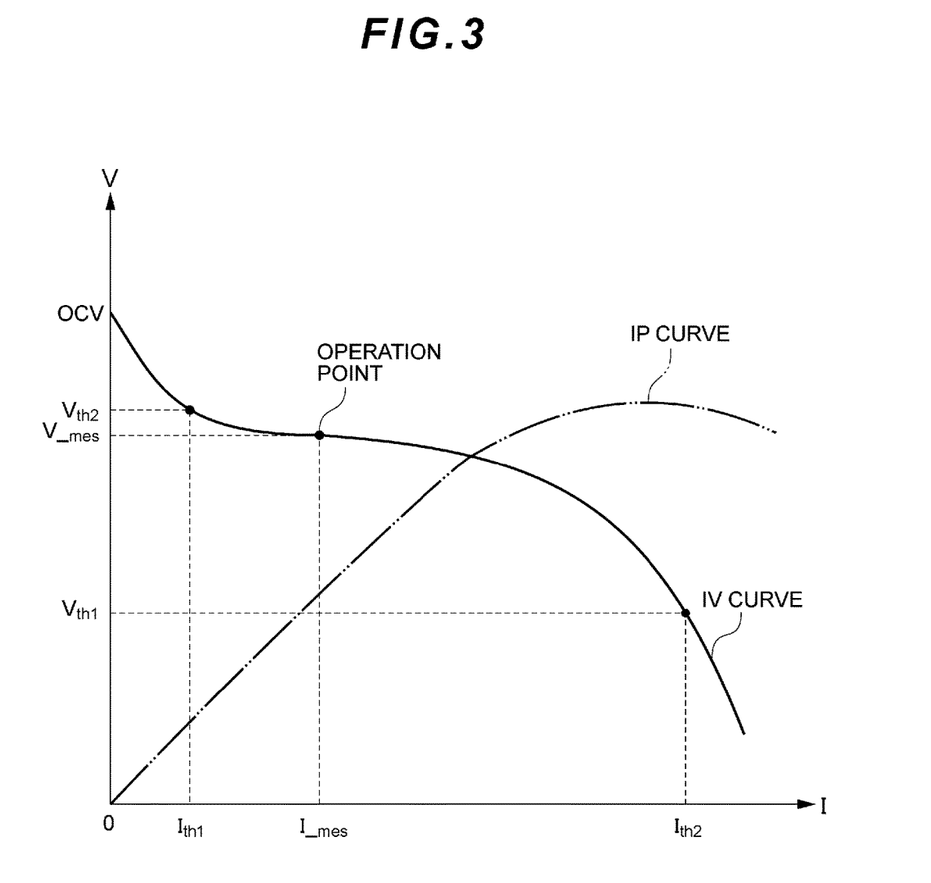
FIG. 3 is a diagram showing an example of IV characteristics and IP characteristics of the fuel cell.

FIG. 3 shows an example of an IV curve indicating current-voltage characteristics (IV characteristics) and an IP curve indicating current-power characteristics (IP characteristics) of the fuel cell 2. In this embodiment, the output voltage of the fuel cell 2 is controlled so as to be within a range between a predetermined low voltage threshold value Vth1 and a predetermined high voltage threshold value Vth2 which can be preset based on, for example, the specification of the fuel cell 2, and thus, the IV characteristics and IP characteristics, as shown in FIG. 3.

The output current of the fuel cell 2 is controlled so as to be within the range between a predetermined low current threshold value Ith1 and a predetermined high current threshold value Ith2 which can be preset based on, for example, the specification of the fuel cell 2, and thus, the IV characteristics and IP characteristics.

The output power of the fuel cell 2 is controlled so as to be within a range between: a predetermined low power threshold value Pth1 which can be obtained by multiplying the low voltage threshold value Vth1 by the low current threshold value Ith1; and a predetermined high power threshold value Pth2 which can be obtained by multiplying the high voltage threshold value Vth2 by the high current threshold value Ith2.

The low voltage threshold value Vth1, high voltage threshold value Vth2, low current threshold value Ith1 and high current threshold value Ith2 are each set at the point where, for example, the output current or output voltage rapidly decreases or increases in the operation points of the IV curve, i.e., the point where the rate of change of the output current or output voltage is relatively large, i.e., the point forming a tangent line whose slope relative to the IV curve is equal to or larger than a predetermined angle, which is close to the vertical slope.

In this embodiment, when the output voltage of the fuel cell 2 becomes equal to or lower than the low voltage threshold value Vth1, the control mode is switched from the power control mode to the voltage control mode even when the power control mode has been selected. In such case, the target voltage of the fuel cell 2 is set to the low voltage threshold value Vth1 or a value obtained by adding a predetermined extra value to the low voltage threshold value Vth1, and then the control in the voltage control mode is performed.

Consequently, since the output voltage of the fuel cell 2 is directly controlled, an excess decrease of the output voltage of the fuel cell 2 can be avoided more promptly and reliably. In other words, the state where the output voltage of the fuel cell 2 is below the low voltage threshold value Vth1 can rapidly be resolved.

In addition, when the output current of the fuel cell 2 becomes equal to or higher than the high current threshold value Ith2 or when the output power of the fuel cell 2 becomes equal to or lower than the low power threshold value Pth1 in the situation where the power control mode has been selected, the control mode is switched from the power control mode to the voltage control mode. In short, in these situations as well, due to the fact that a certain correlation is established between the output voltage of the fuel cell 2 and the output current and output power of the fuel cell 2, the output voltage of the fuel cell 2 tends to deviate from the above-mentioned predetermined range toward the lower voltage side.

Accordingly, by directly controlling the output voltage of the fuel cell 2 in such cases, an excess decrease of the output voltage of the fuel cell 2 can again be avoided more promptly and reliably and the state where the output voltage of the fuel cell 2 is below the low voltage threshold value Vth1 can rapidly be resolved.

The above description has described the case in which an excess decrease of the output voltage of the fuel cell 2 is prevented in the situation where the power generation state of the fuel cell 2 is controlled in the power control mode.

The following description will describe a case in which an excess increase of the output voltage of the fuel cell 2 is prevented in a situation where the power generation state of the fuel cell 2 is controlled in the power control mode.

In this embodiment, when the output voltage of the fuel cell 2 becomes equal to or higher than the high voltage threshold value Vth2, the control mode is switched from the power control mode to the voltage control mode, even when the power control mode has been selected. In such case, the target voltage of the fuel cell 2 is set to the high voltage threshold value Vth2 or a value obtained by subtracting a predetermined extra value from the high voltage threshold value Vth2, and then the control in the voltage control mode is performed.

Consequently, since the output voltage of the fuel cell 2 is directly controlled, an excess increase of the output voltage of the fuel cell 2 can be avoided more promptly and reliably. In other words, the state where the output voltage of the fuel cell 2 is above the high voltage threshold value Vth2 can rapidly be resolved.

In addition, the control mode is also switched from the power control mode to the voltage control mode when the output current of the fuel cell 2 becomes equal to or lower than the low current threshold value Ith1 or when the output power of the fuel cell 2 becomes equal to or higher than the high power threshold value Pth2 in the situation where the power control mode has been selected.

In short, in these situations as well, as is obvious from the above-mentioned correlation, the output voltage of the fuel cell 2 tends to deviate from the above-mentioned predetermined range toward the higher voltage side. Thus, by directly controlling the output voltage of the fuel cell 2, an excess increase of the output voltage of the fuel cell 2 can be avoided more promptly and reliably and the state where the output voltage of the fuel cell 2 is above the high voltage threshold value Vth2 can rapidly be resolved.

Next, a modification example of the duty computing part 20 (FIG. 2) in the above embodiment will be described with reference to FIG. 4. It should be noted that, in the following description, the same components as those of the duty computing part 20 will be denoted by the same reference numerals as those in FIG. 2 and the descriptions thereof will be omitted or simplified.

Figure 4:
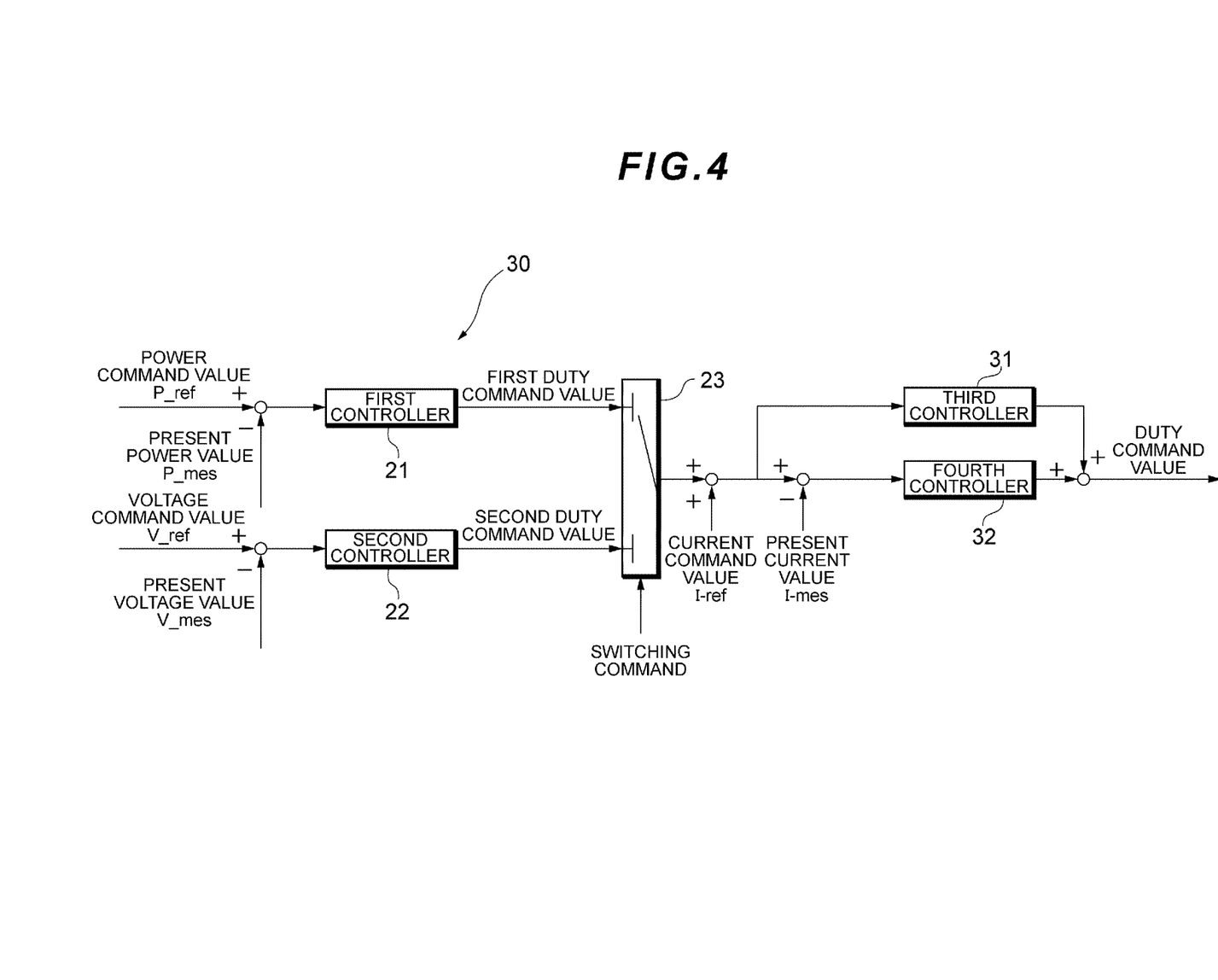
FIG. 4 is a block diagram showing a modification example of the duty computing part in FIG. 2.

As shown in FIG. 4, in a duty computing part 30 according to this modification example, the first controller 21 related to the control of the fuel cell 2 in the power control mode and the second controller 22 related to the control of the fuel cell 2 in the voltage control mode are connected to each other in parallel. The switch (control mode switching part) 23 is provided in the downstream of the first controller 21 and the second controller 22. These configurations are the same as the configurations of the duty computing part 20.

In this modification example, a duty command value to be finally supplied to the first boost converter 5 is calculated by adding, to a first duty command value or a second duty command value selected by the switch 23, a feedback command value and a feed forward command value based on a current command value I_ref and a present current value I_mes.

In short, a third converter 31 included in a feed forward control circuit receives, as inputs, a first duty command value or a second duty command value selected by the switch 23 as a plus component and a current command value I_ref output from, for example, the control part 11 as a plus component.

A fourth controller 32 included in a feedback control circuit receives, as inputs, the first duty command value or second duty command value selected by the switch 23 as a plus component, a current command value I_ref output from, for example, the control part 11 as a plus component and a present current value I_mes calculated from the output value of the current sensor Si as a minus component.

The sum of the output value from the third controller 31 and the output value from the fourth controller 32 constitutes a duty command value to be finally supplied to the first boost converter 5. In other words, according to this modification example, each of the power command value P_ref, the voltage command value V_ref and the current command value I_ref can be input and it is thus possible to achieve a finer control.

Although the above embodiment has assumed a situation where the output control apparatus for the fuel cell according to the present invention is installed in a fuel cell vehicle, the output control apparatus for the fuel cell according to the present invention may also be applied to various types of movable bodies (e.g., robots, boats, ships and planes) other than the fuel cell vehicle. Furthermore, the output control apparatus for the fuel cell according to the present invention may also be applied to a stationary power generating system used as power generating equipment for construction (e.g., for houses and buildings).

DESCRIPTION OF REFERENCE NUMERALS

1: fuel cell system
2: fuel cell
5: first boost converter
6: drive motor (load)
9: battery
10: auxiliary machines
11: control part
20, 30: duty computing part
21: first controller
22: second controller
23: switch (control mode switching part)
31: third controller
32: fourth controller

What is claimed is:

1. An output control apparatus for a fuel cell, programmed to:
   switch a control mode of the fuel cell between a power control mode and a voltage control mode based on an amount of operation of an acceleration operating member, wherein
      in the power control mode, an output power of the fuel cell connected to a load is controlled so as to be at a target power,
      in the voltage control mode, an output voltage of the fuel cell is controlled so as to be at a target voltage, and
   the output control apparatus is programmed to select the voltage control mode when the output voltage of the fuel cell decreases below a predetermined low voltage threshold value; and
   output a duty command value related to one of the target power and the target voltage.

2. The output control apparatus for a fuel cell according to claim 1, further programmed to, when the voltage control mode is selected, set the target voltage to one of the low voltage threshold value and a value obtained by adding a predetermined extra value to the low voltage threshold value, prior to controlling the fuel cell in the voltage control mode.

3. The output control apparatus for a fuel cell according to claim 1, further programmed to select the voltage control mode when the output voltage of the fuel cell increases above a predetermined high voltage threshold value.

4. The output control apparatus for a fuel cell according to claim 3, further programmed to, when the voltage control mode is selected when the output voltage of the fuel cell increases above a predetermined high voltage threshold value, set the target voltage to one of the high voltage threshold value and a value obtained by subtracting a predetermined extra value from the high voltage threshold value, prior to controlling the fuel cell in the voltage control mode.

5. The output control apparatus for a fuel cell according to claim 1, comprising a duty computing part programmed to compute the duty command value and supply the duty command value to a boost converter, which boosts the output voltage of the fuel cell and outputs the boosted voltage to the load,
   wherein the duty computing part is programmed to output a first duty command value calculated using the output power and the target power of the fuel cell when the fuel cell is controlled in the power control mode and output a second duty command value calculated using the output voltage and the target voltage of the fuel cell when the fuel cell is controlled in the voltage control mode.

6. The output control apparatus for a fuel cell according to claim 5, wherein the duty computing part comprises a control mode switching part to select, as the duty command value to be supplied to the boost converter, the first duty command value when the fuel cell is controlled in the power control mode and the second duty command value when the fuel cell is controlled in the voltage control mode.

* * * * *